UNITED STATES PATENT OFFICE.

GEORGE RUDORF, OF LONDON, ENGLAND, ASSIGNOR TO THE PERMUTIT COMPANY, OF NEW YORK, N. Y., A CORPORATION OF DELAWARE.

PROCESS OF MAKING EXCHANGE BODIES.

1,263,707.  Specification of Letters Patent.  Patented Apr. 23, 1918.

No Drawing.  Application filed December 22, 1916. Serial No. 138,373.

*To all whom it may concern:*

Be it known that I, GEORGE RUDORF, a citizen of the British Empire, residing at London, have invented certain new and useful Improvements in Processes of Making Exchange Bodies, of which the following is a specification.

This invention relates to processes of making base-exchange bodies; and it comprises a method of producing reactive, mechanically desirable exchange bodies wherein solutions of two more or less amphoteric and colloid oxids or hydroxids are brought into reaction, one such solution being an alkaline solution and the other neutral or acid and containing an acid capable of neutralizing the alkali of the first solution, the amount of such acid and the amount of such alkali being such that most, but not all, of such alkali is neutralized, such amounts being so chosen as to produce a final reaction which is neutral, or substantially so to phenolphthalein, as in reacting upon a solution of silica in caustic soda (sodium silicate) with a solution of sulfate of alumina in such quantity as to yield a final mixture neutral to phenolphthalein; all as more fully hereinafter set forth and as claimed.

The use of reactive "exchange silicates" for the purification of water is becoming extensive. These silicates, empirically considered, contain silica ($SiO_2$), alumina ($Al_2O_3$), water and more or less alkali ($Na_2O$) in mutual combination. In use, a hard water is contacted therewith whereupon they exchange their alkali for the lime or magnesia, or both, of such water. The exchange silicate is converted, more or less completely, into corresponding calcium or magnesium compounds. It may then be revivified by treatment with salt when the calcium and magnesium go into solution, being replaced by an equivalent amount of sodium. The material is then ready for re-use. These materials are customarily used in granular form in filter-like beds. Used in this way it is obvious that the material must be granular, must be indefinitely pervious in order to expose a large surface, must be highly reactive in producing the described exchange and must also be in hard or rigid, mechanically resistant particles which will resist erosion, sliming, mudding down, etc. In the art, it has been customary to produce such material by a fusion process with subsequent hydration by treatment with water in special ways. By the use of suitable and special methods devised for this purpose material of good quality, both in chemical respects and mechanical respects, can be secured. But these processes are more or less expensive and it is an object of the present invention to provide a cheaper method giving equally effective material without the necessity for a preliminary fusion.

It has long been known (Lemberg, *Zeitschrift der deutschen Geologischen Gesellschaft*, 1876, page 574) that precipitates which would have the necessary chemical properties could be produced from solutions; as for instance by mixing a solution of alkali aluminate with a solution of alkali silicate. Although both the alumina and the silica are in alkaline solution, nevertheless the mixture of the two solutions gives an alkali-containing precipitate with the excess of alkali remaining in solution. The precipitate has in a general way the required chemical properties but its mechanical form is of course not one which adapts it to practical use. Very many attempts in the prior art have been made to improve upon this Lemberg process and produce a material which would be more suitable for technical use. However, in all cases the interacting solutions have both been alkaline, and the mother liquor after precipitation contains a very considerable amount of excess caustic alkali. If the precipitate be now separated from the mother liquor, it will contain excess alkali corresponding in amount to the quantity of mother liquor retained therein. This excess must be in part removed; the presence of some excess alkali in the precipitate is, however, necessary but the amount should vary within rather narrow limits. By working in more dilute solution, the amount of washing of the precipitate may be diminished but there is a limit to the dilution beyond which no precipitate will form, at least in reasonable time. Efforts to control this by the addition of colloid precipitating electrolytes like sulfate of soda, sodium chlorid, etc., have the disadvantage that these electrolytes must then be washed out of the precipitate in addition to the excess caustic alkali.

It is the object of the present invention to avoid the use of excess alkali and at the same time to produce satisfactory materials of definite character. To attain this end, I use one of the bodies which is to form a component of my precipitate in an alkaline solution and the other in a neutral saline solution or acid solution and mix the two solutions together so that the acid of the one solution will neutralize the alkali of the other solution to a certain definite extent. I have found that if the two solutions be so admixed as to produce a resulting admixture neutral to phenolphthalein and similar indicators I can directly produce a precipitate having the required amount of alkali in it, in a, so to speak, indifferent neutral solution which has no solvent or other chemical effect upon it. The indicators of the phenolphthalein class are particularly suitable because of their sensitiveness to excess of alkali in the presence of even weak acids, whereas indicators of the methyl orange category are scarcely affected in their color reactions by weak acids. All the precipitates obtained between the points where phenolphthalein and methyl orange or Kongo red, respectively, show neutrality, have the exchange property but those produced when the solution shows neutral, or nearly so, to phenolphthalein, are the best.

Assuming that waterglass is approximately sodium disilicate ($Na_2Si_2O_5$) and that its solution is precipitated by a solution of aluminum sulfate, the point at which the mixture begins to react acid to methyl orange, Kongo red, lacmoid, etc., is approximately as indicated by the following equation:

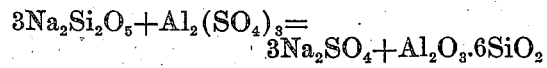

$$3Na_2Si_2O_5 + Al_2(SO_4)_3 = 3Na_2SO_4 + Al_2O_3.6SiO_2$$

As will be noted, in this equation all the sodium of the sodium silicate is combined with the sulfuric acid of the aluminum sulfate and none is left to combine with the alumina and the silica. On the other hand if the addition be until the mixture just reacts no longer alkaline to phenolphthalein the reaction is approximately as illustrated in the following equation:

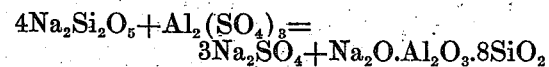

$$4Na_2Si_2O_5 + Al_2(SO_4)_3 = 3Na_2SO_4 + Na_2O.Al_2O_3.8SiO_2$$

This latter equation is given merely to show in a broad way the ratio of sodium to alumina and silica in the precipitate and in no wise indicates the actual chemical composition of the material in the precipitate. The way in which the three component oxids are combined with each other and with water is not known. The equation does not show the presence of water, water having been omitted for the sake of clarity, but the precipitate obtained is of course a hydrated one.

In one embodiment of my invention I proceed as above indicated, mixing a solution of aluminum sulfate with a solution of commercial waterglass in such proportions that the final mixture shall be neutral, or approximately so, to phenolphthalein. A precipitate falls and this precipitate may be simply washed to free it of mother liquor and dried. It is best to wash it in a filter press, forming a cake. This cake is given enough washing to free it of mother liquor and is then dried at a temperature below 100° C. The final cake is broken up or granulated in granules of the requisite size and is then ready for use. It combines the desired chemical and physical properties in a high degree, having good exchange properties, being pervious and being mechanically rigid and strong. In a still simpler embodiment of my process the precipitate is filter pressed as before to rid it of the bulk of the mother liquor and the cake is then directly dried without any substantial washing. After drying it may be treated with hot water, whereupon the cake will break up into fragments, forming minutely pervious granules, the sodium sulfate left in the cake being washed out.

In a specific embodiment of the described process, I dissolve 30 parts commercial waterglass containing about 27.5 per cent. of $SiO_2$ in 300 parts water. To this solution I now add a 5 per cent. solution of commercial aluminum sulfate containing about 15 per cent. $Al_2O_3$ until the coloration of phenolphthalein just disappears. For this purpose about 11 parts aluminium sulfate will be required if the waterglass be approximately disilicate. The actual amount required will depend both on the composition of the waterglass and on the composition of the aluminium sulfate. The aluminium sulfate solution should be added fairly slowly and the mixture well stirred during the operation. To aid coagulation and the subsequent filtration, the mixture may be warmed after precipitation to, say, 60 to 70 degrees centigrade. With rather less water than that indicated the warming may be omitted. The gelatinous mass is then filtered off, dried at a temperature not exceeding 100 degrees centigrade and leached with water to rid it of soluble salts. It is then ready for use. Exchange bodies may be obtained in a similar way from a wide variety of other materials than those just noted. It is only necessary to mix two solutions of two hydroxids of more or less amphoteric properties together, one such solution being alkaline in reaction and the other being neutral or acid. By the word "neutral" in this connection I mean chemically neutral; that is, containing an amount of acid component chemically equivalent to the oxid functioning as a base, as for example aluminum sulfate. Aluminum sulfate of course while a chemically neutral body is actually highly acid to phenolphthalein and similar indicators. For example, I may use as the alkaline component a solution of a stannate, titanate, zirconate, zincate, plumbite, etc. For furnishing oxid in neutral or acid solution instead of using aluminum sulfate, I may use salts of chromium, zinc, etc. Indefinite permutations among these materials are possible. With a solution of waterglass and one of zinc sulfate, the activity of the resulting material although substantial is not great; it is not as good as that obtained with waterglass and aluminum sulfate. With a sodium aluminate solution and a solution of tin bichlo.·d or tetrachlorid, the activity of the material formed is quite great. But I find the most advantageous combination is that described formed by admixing solutions of aluminum sulfate and sodium silicate. Other aluminum salts, such as the chlorid, nitrate, etc., may be used in lieu of the sulfate.

A solution of an iron salt may be used in lieu of the solution of the aluminum salt, as for instance ferric chlorid or sulfate or ferrous chlorid or sulfate. But I regard material made with aluminum salts as much superior.

By an amphoteric hydroxid in the specification and claims I mean a hydroxid or hydrated oxid having both basic and acid properties; and for the purposes of this application aluminum sulfate, both the normal sulfate $Al_2(SO_4)_3$ or $Al_2O_3.3SO_3$, and the basic salt may be regarded as a solution of an oxid, or hydroxid in sulfuric acid just as a solution of sodium aluminate may be regarded as an oxid or hydroxid (alumina) dissolved in an alkali solution. In an aluminum sulfate solution, the alumina is kept in a soluble form, that is, in solution by an acid radical, sulfuric acid; and in sodium aluminate solution by an alkaline radical.

What I claim is:—

1. The process of making base exchange materials which comprises mixing an alkaline solution of an amphoteric hydroxid with a non-alkaline solution of another hydroxid capable of precipitating the first stated hydroxid, the amounts and strengths of the two solutions employed being such as give a resultant mixture substantially neutral to the phenolphthalein class of indicators, separating the precipitate from the mother liquor and drying.

2. The process of making base exchange materials which comprises admixing a solution of an alkaline silicate with a non-alkaline solution of an amphoteric oxid until the resulting solution is substantially neutral to the phenolphthalein class of indicators, separating the precipitate and the mother liquor and drying the precipitate.

3. The process of making base exchange materials which comprises mixing a solution of an alkaline silicate with a solution of a salt of aluminum with an acid until the resulting mixture is substantially neutral to the phenolphthalein class of indicators, separating the precipitate and the mother liquor and drying the precipitate.

4. The process of making base exchange materials which comprises mixing an alkaline solution of an amphoteric hydroxid with a non-alkaline solution of another hydroxid capable of precipitating the first stated hydroxid, the amounts and strengths of the two solutions employed being such as to give a resultant mixture substantially neutral to the phenolphthalein class of indicators, separating the precipitate from the mother liquor by filter pressing, drying, and leaching to extract retained salts.

5. The process of making base exchange materials which comprises mixing a solution of an alkaline silicate with a solution of a salt of aluminum with an acid until the resulting mixture is substantially neutral to the phenolphthalein class of indicators, separating the precipitate from the mother liquor by filter pressing, drying and leaching to extract retained salts.

6. In the manufacture of base exchanging materials, the process which comprises mixing a solution of an alkaline silicate with a solution of a metal salt containing an acid radical, the proportions of the two solutions being such that the mixture will be distinctly alkaline to the methyl orange class of indicators but not alkaline to the phenolphthalein class of indicators.

7. In the manufacture of base exchanging materials, the process which comprises mixing a solution of an alkaline silicate with a solution of an aluminum salt containing an acid radical, the proportions of the two solutions being such that the mixture will be distinctly alkaline to the methyl orange class of indicators but not alkaline to the phenolphthalein class of indicators.

In testimony whereof, I affix my signature.

G. RUDORF.